US012812447B2

(12) United States Patent

Báder et al.

(10) Patent No.: US 12,812,447 B2

(45) Date of Patent: Nov. 24, 2026

(54) TRAFFIC FORWARDING POLICY DETERMINATION IN A WIRELESS COMMUNICATION SYSTEM

(71) Applicant: Telefonaktiebolaget LM Ericsson (publ), Stockholm (SE)

(72) Inventors: Attila Báder, Paty (HU); Gergely Dévai, Budapest (HU); Dinand Roeland, Sollentuna (SE); András Zahemszky, Sollentuna (SE); Stefan Håkansson, Gothenburg (SE); Karthik R M, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 420 days.

(21) Appl. No.: 18/012,566

(22) PCT Filed: Mar. 29, 2021

(86) PCT No.: PCT/EP2021/058132

§ 371 (c)(1),
(2) Date: Dec. 22, 2022

(87) PCT Pub. No.: WO2021/259529

PCT Pub. Date: Dec. 30, 2021

(65) Prior Publication Data

US 2023/0261996 A1 Aug. 17, 2023

(30) Foreign Application Priority Data

Jun. 24, 2020 (IN) ............................ 202011026696

(51) Int. Cl.

| | |
|---|---|
| ***H04W 28/02*** | (2009.01) |
| ***H04L 41/0894*** | (2022.01) |
| ***H04L 47/20*** | (2022.01) |

(52) U.S. Cl.

CPC ..... *H04W 28/0268* (2013.01); *H04L 41/0894* (2022.05); *H04L 47/20* (2013.01); *H04W 28/0236* (2013.01)

(58) Field of Classification Search

CPC ......... H04W 28/0268; H04W 28/0236; H04W 28/02; H04L 41/0894; H04L 47/20;

(Continued)

(56) References Cited

U.S. PATENT DOCUMENTS

| | | | | |
|---|---|---|---|---|
| 8,606,911 B2 * | 12/2013 | Raleigh | ................ | H04M 15/66 709/224 |
| 9,055,557 B1 * | 6/2015 | Bayar | ............... | H04M 15/8228 |

(Continued)

FOREIGN PATENT DOCUMENTS

| | | |
|---|---|---|
| CN | 107113635 A | 8/2017 |
| CN | 108023766 A | 5/2018 |

(Continued)

OTHER PUBLICATIONS

3GPP TS 23.501 V16.6.0, 3rd Generation Partnership Project, "3rd Generation Partnership Project; Technical Specification Group Services and System Aspects; System architecture for the 5G System (5GS); Stage 2 (Release 16)", Technical Specification, Sep. 2020, pp. 1-447, 3GPP, France.

(Continued)

*Primary Examiner* — Bailor C Hsu

(74) *Attorney, Agent, or Firm* — Rothwell, Figg, Ernst & Manbeck, P.C.

(57) ABSTRACT

Traffic forwarding policy determination in a wireless communication system A node (310) of the wireless communication network receives first data indicative of estimated QoE levels of data traffic in the wireless communication network. The data traffic is subject to QoS rules enforced by one or more nodes of the wireless communication network.

(Continued)

Further, the node (310) receives second data indicative of QoS statistics observed in association with the QoE levels. Based on the first data and the second data, the node (310) determines a traffic forwarding policy for the data traffic. The traffic forwarding policy defines QoS rules which, according to the observed QoS statistics, are expected to ensure that a QoE target is met.

19 Claims, 10 Drawing Sheets

(58) Field of Classification Search
CPC . H04L 41/16; H04L 41/5025; H04L 41/5067; H04L 43/0852
See application file for complete search history.

(56) References Cited

U.S. PATENT DOCUMENTS

| | | | | |
|---|---|---|---|---|
| 9,295,070 | B2 * | 3/2016 | Damola | H04W 28/16 |
| 9,544,201 | B2 * | 1/2017 | Sanchez Vega | H04L 41/0893 |
| 9,712,400 | B1 * | 7/2017 | Gegout | H04L 45/302 |
| 9,794,145 | B2 * | 10/2017 | Vasseur | H04L 41/147 |
| 10,447,541 | B2 * | 10/2019 | Gaikwad | H04L 41/0893 |
| 10,506,558 | B2 * | 12/2019 | Zhang | H04L 41/082 |
| 10,547,563 | B2 * | 1/2020 | Zhang | H04L 47/827 |
| 10,645,014 | B2 * | 5/2020 | Tomici | H04L 47/2483 |
| 10,897,424 | B1 * | 1/2021 | Dhanabalan | H04L 45/306 |
| 10,944,641 | B1 * | 3/2021 | Zacks | G06F 3/04847 |
| 10,986,516 | B2 * | 4/2021 | Dao | H04W 24/08 |
| 10,999,447 | B2 * | 5/2021 | Qiao | H04W 28/24 |
| 11,102,236 | B2 * | 8/2021 | Shurtleff | G06F 11/00 |
| 11,140,047 | B2 * | 10/2021 | Shan | H04L 41/0895 |
| 11,297,530 | B2 * | 4/2022 | Dao | H04W 28/0268 |
| 11,382,145 | B2 * | 7/2022 | Dao | H04W 4/06 |
| 11,558,813 | B2 * | 1/2023 | Park | H04W 48/18 |
| 11,637,753 | B1 * | 4/2023 | Wang | H04L 41/0893 709/223 |
| 11,678,252 | B2 * | 6/2023 | Dao | H04W 8/08 370/329 |
| 11,838,799 | B2 * | 12/2023 | Zhang | H04W 28/0942 |
| 11,864,019 | B2 * | 1/2024 | Li | H04L 49/70 |
| 2009/0247163 | A1 | 10/2009 | Aoyama | |
| 2012/0002541 | A1 | 1/2012 | Lee et al. | |
| 2015/0304737 | A1 | 10/2015 | Franklin et al. | |
| 2017/0289047 | A1 * | 10/2017 | Szilágyi | H04L 41/5067 |
| 2017/0332282 | A1 | 11/2017 | Dao | |
| 2018/0262924 | A1 | 9/2018 | Dao et al. | |
| 2019/0124555 | A1 * | 4/2019 | Szilagyi | H04W 28/0268 |
| 2020/0029240 | A1 | 1/2020 | Li | |
| 2020/0029253 | A1 | 1/2020 | Yan et al. | |
| 2020/0112907 | A1 | 4/2020 | Dao et al. | |
| 2020/0196169 | A1 | 6/2020 | Dao et al. | |
| 2020/0305201 | A1 | 9/2020 | Lei et al. | |
| 2020/0328947 | A1 | 10/2020 | Iwai et al. | |
| 2021/0029043 | A1 * | 1/2021 | Dhanabalan | H04L 41/147 |
| 2021/0092062 | A1 * | 3/2021 | Dhanabalan | H04L 47/2425 |
| 2022/0014512 | A1 * | 1/2022 | Raleigh | H04L 63/0823 |
| 2022/0038946 | A1 | 2/2022 | Kim et al. | |
| 2022/0057791 | A1 * | 2/2022 | Saraf | G05B 13/0265 |
| 2022/0151004 | A1 * | 5/2022 | Sedlacek | H04W 8/082 |
| 2022/0182718 | A1 | 6/2022 | Yelda et al. | |
| 2022/0239578 | A1 * | 7/2022 | Raleigh | H04M 15/66 |
| 2023/0081673 | A1 * | 3/2023 | Junkins | H04W 24/08 370/235 |
| 2023/0246903 | A1 | 8/2023 | Huet et al. | |

FOREIGN PATENT DOCUMENTS

| | | | |
|---|---|---|---|
| CN | 108353000 | A | 7/2018 |
| CN | 110225418 | A | 9/2019 |
| EP | 3225046 | | 10/2017 |
| WO | 2016095826 | A1 | 6/2016 |
| WO | 2021259529 | A1 | 12/2021 |

OTHER PUBLICATIONS

3GPP TR 23.791 V16.2.0, 3rd Generation Partnership Project, "3rd Generation Partnership Project; Technical Specification Group Services and System Aspects; Study of Enablers for Network Automation for 5G (Release 16)", Technical Report, Jun. 2019, pp. 1-124, 3GPP, France.

3GPP TS 28.533 V16.5.1, 3rd Generation Partnership Project, "3rd Generation Partnership Project; Technical Specification Group Services and System Aspects; Management and orchestration; Architecture framework (Release 16)", Technical Specification, Sep. 2020, pp. 1-30, 3GPP, France.

3GPP TS 23.288 V16.5.0, 3RD Generation Partnership Project, "3rd Generation Partnership Project; Technical Specification Group Services and System Aspects; Architecture enhancements for 5G System (5GS) to support network data analytics services (Release 16)", Technical Specification, Sep. 2020, pp. 1-66, 3GPP, France.

International Search Report and Written Opinion dated Jun. 29, 2021 in International Application No. PCT/EP2021/058132 (9 pages).

3GPP TS 23.501 version 16.3.0, Dec. 2019, Technical Specification, 3rd Generation Partnership Project; Technical Specification Group Services and System Aspects; System architecture for the 5G System (5GS); Stage 2 (Release 16), Sophia Antipolis Valbonne, France (417 pages).

3GPP TS 28.533 version 16.2.0, Dec. 2019, Technical Specification, 3rd Generation Partnership Project; Technical Specification Group Services and System Aspects; Management and orchestration; Architecture framework (Release 16), Sophia Antipolis Valbonne, France (29 pages).

3GPP TS 23.288 V16.3.0, Mar. 2020, Technical Specification, 3rd Generation Partnership Project; Technical Specification Group Services and System Aspects; Architecture enhancements for 5G System (5GS) to support network data analytics services (Release 16), Sophia Antipolis Valbonne, France (62 pages).

Non-Final Office Action issued in U.S. Appl. No. 18/269,661 on Aug. 28, 2025 (15 pages).

U.S. Appl. No. 63/121,387 Provisional Application filed Dec. 4, 2020. (Year:2020) (31 pages).

Notice of Allowance issued in U.S. Appl. No. 18/269,661, dated Feb. 2, 2026. (19 pages).

* cited by examiner

TRAFFIC FORWARDING POLICY DETERMINATION IN A WIRELESS COMMUNICATION SYSTEM

CROSS REFERENCE TO RELATED APPLICATIONS

This application is a 35 U.S.C. § 371 National Stage of International Patent Application No. PCT/EP2021/058132, filed Mar. 29, 2021, which claims priority to Indian Patent Application No. 202011026696, filed on Jun. 24, 2020, which is incorporated by this reference.

TECHNICAL FIELD

The present invention relates to methods for controlling transmission of data in a wireless communication network and to corresponding devices, systems, and computer programs.

BACKGROUND

In wireless communication networks, e.g., as specified by 3GPP (3$^{rd}$ Generation Partnership Project), it is known to control user data traffic with the aim of providing a certain QoS (Quality of Service). For example, the 4G (4$^{th}$ Generation) LTE (Long Term Evolution) technology or the 5G (5$^{th}$ Generation) NR (New Radio) technology specified by 3GPP provide a PCC (Policy and Charging Control) architecture which enables control of the user data traffic by enforcing QoS rules. Details concerning the PCC architecture and its functionalities can for example be found in 3GPP TS 23.203 V 16.2.0 (2019-12) and 3GPP TS 23.501 V 16.4.0 (2020-03).

3GPP TS 23.501 V 16.4.0 defines a 5G Quality of Service Indicator (5QI), which is used as a reference to a QoS forwarding behavior. This forwarding behavior is characterized by, e.g., packet error rate, packet delay budget and priority. Here, the packet delay budget defined by the 5QIs typically includes delay both in an Access Network (AN) part and in a Core Network (CN) part of the 5G wireless communication network. In addition to standardized 5QI values, network service providers may also define custom 5QIs. In the AN, the forwarding behavior associated with the 5QIs may be implemented by node-specific parameters that determine the packet forwarding behavior, e.g., by scheduling weights, admission thresholds, queue management thresholds, link layer protocol configuration, or the like. In a similar manner, the 4G LTE technology utilizes a Quality Class Indicator (QCI) for indicating a desired QoS forwarding behavior.

Further, in the 5G NR technology, each PDU (Packet Data Unit) session involves one or more QoS Flows. The QoS Flows may be regarded as the finest granularity of QoS differentiation within the PDU session, and each PDU in the same QoS flow is expected to get the same packet forwarding treatment, designated by a 5QI. In typical scenarios, there will be many QoS flows at a time, each associated with a corresponding 5QI to designate the desired packet forwarding treatment. Similarly, in the 4G LTE technology multiple EPS bearers may be established for QoS differentiation and be associated with a QCI to designate the desired packet forwarding treatment.

In practice, it may however be difficult to map the appropriate 5QI to the various traffic types that may exist in a 5G networks or to properly define a custom 5QI for a certain traffic type. As a result, it may be difficult for the network operator to meet QoE (Quality of Experience) targets. Here, QoE is considered as a measure of quality from the perspective of the user. The QoE may be assessed in terms of subjective levels, such as “good” or “bad”. However, it is also possible to more precisely quantify the QoE in terms of multiple levels or a value.

QoE targets may be based on SLAs (Service Level Agreements) with service providers or on internal business goals of the network operator. Typically, if such QoE target is not met for a certain traffic type, the data traffic would be manually mapped to a different 5QI. This may be a time-consuming procedure, in particular when there are a lot of 5QIs to be checked and potentially changed. Still further, such manual mapping or remapping may provide unsatisfactory results. For example, it could occur that the QoE target is met, but the given data traffic is mapped to a 5QI which defines too strict QoS targets, resulting in unnecessary consumption of network resources, e.g., in terms of reserved radio resources. This in turn bars the risk of adversely affecting other traffic types.

Accordingly, there is a need for techniques which allow for efficiently managing traffic forwarding policies applied in a wireless communication network.

SUMMARY

According to an embodiment, a method of controlling user data traffic in a wireless communication network is provided. According to the method, a node of the wireless communication network receives first data indicative of estimated QoE levels of data traffic in the wireless communication network. The data traffic is subject to QoS rules enforced by one or more nodes of the wireless communication network. Further, the node receives second data indicative of QoS statistics observed in association with the QoE levels. Based on the first data and the second data, the node determines a traffic forwarding policy for the data traffic. The traffic forwarding policy defines QoS rules which, according to the observed QoS statistics, are expected to ensure that a QoE target is met.

According to a further embodiment, a node for a wireless communication network is provided. The node is configured to receive first data indicative of estimated QoE levels of data traffic in the wireless communication network. The data traffic is subject to QoS rules enforced by one or more nodes of the wireless communication network. Further, the node is configured to receive second data indicative of QoS statistics observed in association with the QoE levels. Further, the node is configured to, based on the first data and the second data, determine a traffic forwarding policy for the data traffic. The traffic forwarding policy defines QoS rules which, according to the observed QoS statistics, are expected to ensure that a QoE target is met.

According to a further embodiment, a node for a wireless communication network is provided. The node comprises at least one processor and a memory. The memory contains instructions executable by said at least one processor, whereby the node is operative to receive first data indicative of estimated QoE levels of data traffic in the wireless communication network. The data traffic is subject to QoS rules enforced by one or more nodes of the wireless communication network. Further, the memory contains instructions executable by said at least one processor, whereby the node is operative to receive second data indicative of QoS statistics observed in association with the QoE levels. Further, the memory contains instructions executable by said at least one processor, whereby the node is operative to, based on the first data and the second data, determine a traffic forwarding policy for the data traffic. The traffic forwarding policy defines QoS rules which, according to the observed QoS statistics, are expected to ensure that a QoE target is met.

According to a further embodiment of the invention, a computer program or computer program product is provided, e.g., in the form of a non-transitory storage medium, which comprises program code to be executed by at least one processor of a node for a wireless communication network. Execution of the program code causes the node to receive first data indicative of estimated QoE levels of data traffic in the wireless communication network. The data traffic is subject to QoS rules enforced by one or more nodes of the wireless communication network. Further, execution of the program code causes the node to receive second data indicative of QoS statistics observed in association with the QoE levels. Further, execution of the program code causes the node to, based on the first data and the second data, determine a traffic forwarding policy for the data traffic. The traffic forwarding policy defines QoS rules which, according to the observed QoS statistics, are expected to ensure that a QoE target is met.

Details of such embodiments and further embodiments will be apparent from the following detailed description of embodiments.

DETAILED DESCRIPTION OF EMBODIMENTS

Figure 1:
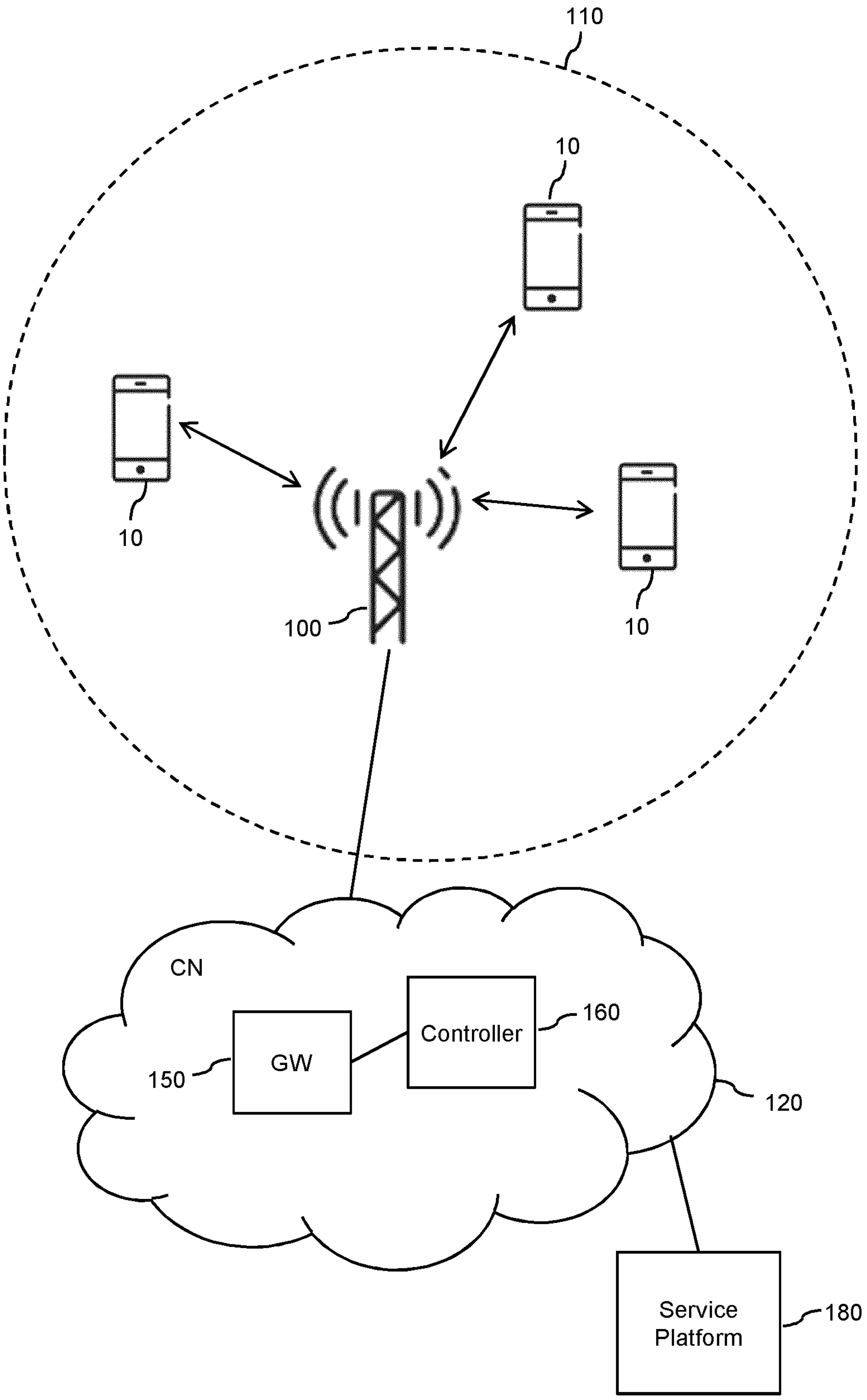
FIG. 1 schematically illustrates an exemplary wireless communication network according to an embodiment of the invention.

In the following, concepts in accordance with exemplary embodiments of the invention will be explained in more detail and with reference to the accompanying drawings. The illustrated embodiments relate to controlling user data traffic in a wireless communication network. The wireless communication network may be based on various technologies. In some of the following, utilization of the 5G NR technology is assumed. Nonetheless it is to be understood the illustrated concepts could also be additionally or alternatively applied in connection with other technologies, e.g., in a wireless communication network based on the LTE radio technology, or a wireless communication network based on a combination of the 5G NR technology and the 4G LTE technology.

The illustrated concepts aim at efficiently determining traffic forwarding policies to be applied in the wireless communication network. In particular, QoS statistics observed in connection with estimated QoE levels are used as a basis for determining a traffic forwarding policy that is expected to ensure that a QoE target is met. The traffic forwarding policies may each correspond to a different 5QI. In other words, the 5QIs may be used to identify traffic forwarding policies to be applied to a certain parts or types of the data traffic, e.g., to one or more QoS flows. The determination of the traffic forwarding policy may involve identifying, among already configured traffic forwarding policies, a traffic forwarding policy defining QoS rules expected to be appropriate to meet the QoE target. In some scenarios, the determination of the traffic forwarding policy may also involve newly configuring a traffic forwarding policy or reconfiguring an existing traffic forwarding policy to define QoS rules expected to be appropriate to meet the QoE target.

The different types of the data traffic may thus be mapped to different traffic forwarding policies. These may in turn define different packet level QoS target parameters, such as for packet loss and/or packet delay, as well as different scheduling and forwarding priorities. The traffic forwarding policies may be configured or otherwise managed by an Operation and Management (OAM) system of the wireless communication network.

For determining the traffic forwarding policy, an analytics system of the wireless communication network evaluates data indicative of estimated QoE levels of data traffic subject to QoS rules. These data are in the following also referred to as QoE data. The QoE data may be based on measurements performed on data traffic transmitted during regular operation of the wireless communication network. In some scenarios, the QoE data may also be based on a probe set of QoS rules defined for test purposes. The probe set of QoS rules may be applied with respect to a limited group of users and/or a limited group of services. Each of the traffic forwarding policies may define one or more target parameters for the QoS, in the following also referred to as QoS targets. The target parameters may in particular include a maximum delay, i.e., a delay value which is not to be exceeded by transmitted data packets, and/or a maximum packet error rate, i.e., a number of unsuccessfully transmitted data packets in a certain time interval, which is not to be exceeded. The maximum delay may also be referred to as packet delay budget. The maximum packet error rate may also be referred to as maximum packet loss rate. Further, each of the data forwarding policies may also be associated with a priority to be applied when handling the data traffic assigned to this data forwarding policy. The QoS targets may be considered when determining the QoS statistics to be used as input for the determination of the traffic forwarding policy. The QoS statistics may be based on measured QoS parameters, e.g., measured packet delays and/or measured packet error rates. These measured QoS parameters are in the following also referred to as measured QoS data.

The illustrated concepts may thus enable automated learning of traffic forwarding policies that ensure QoE targets of certain type of data traffic. Such QoE target may be defined by an SLA between an operator of the wireless communication network and a service provider or may be derived from business goals of the operator. For each of the different types of data traffic, the QoE may be continuously estimated and reported to the analytics system. This may be accomplished per QoS flow or QoS flow segment. The analytics system may further collect the measured QoS data, e.g., delay, loss, and optionally other QoS parameters like jitter, throughput or the like. In this way the analytics system may obtain QoS statistics that are indicative of a certain QoE level. The analytics system may also detect whether the QoE target is met with the applied QoS rules.

In some scenarios, the currently applied traffic forwarding policy could not be optimal because the QoE target is not met, e.g., the currently applied 5QI may not be sufficiently strict. In other scenarios, the currently applied traffic forwarding policy may ensure that the QoE target is met, but the QoE target could also be met with a less strict traffic forwarding policy, e.g., the currently applied 5QI could be too strict. In the latter case, it may also be possible that the QoE target can be met with less network resource consumption. Based on the QoS targets of the traffic forwarding policies and the QoS statistics associated with the observed QoE levels, the analytics system may estimate an expected QoE level for a given traffic forwarding policy. This may in turn be used for identifying traffic forwarding policies which is expected to meet the given QoE target. From these traffic forwarding policies, the analytics system may then select the one requiring the lowest amount of network resources.

In some scenarios, the analytics system may associate a cost function with each traffic forwarding policy. A value of the cost function may represent the amount of network resources required by the traffic forwarding policy. When selecting among multiple traffic forwarding policies enabling to meet the given QoE target, the analytics system may select the traffic forwarding policy associated with the lowest value of the cost function. The cost function can also be more complex and take into account various other factors, like business considerations. The cost function may also change overtime.

The QoS statistics used on the illustrated concepts may take into account the QoS targets configured for each traffic forwarding policy, in particular target packet delay and target packet error rate. Further, each traffic forwarding policy may also define a priority parameter, which may influence the measured packet error rate and measured packet delay. This may be taken into account by using a certain packet-error-rate-percentile and/or a certain packet-delay-percentile, e.g., 95 or 99 percentiles, of the measured packet delay and/or measured packet error rates instead of the configured target values.

Having determined the traffic forwarding policies, the data traffic is mapped to the traffic forwarding policies, e.g., by indicating the determined traffic forwarding policies as recommendation for certain types of data traffic to nodes of the wireless communication network.

FIG. 1 illustrates exemplary structures of the wireless communication network. In particular, FIG. 1 shows multiple UEs 10 in a cell 101 of the wireless communication network. The cell 101 is assumed to be served by an access node 100, e.g., a gNB of the 5G NR technology or an eNB of the 4G LTE technology. The access node 100 may be regarded as being part of the AN part of the wireless communication network, in particular as being part of a RAN (Radio Access Network) of the wireless communication network. Further, FIG. 1 schematically illustrates a core network (CN) part 120 of the wireless communication network. In FIG. 1, the CN part 120 is illustrated as including a GW (gateway) 150 and a controller 160. The GW 150 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The controller 160 may in turn be responsible for controlling the user data traffic with respect to QoS, e.g., by providing QoS rules to be enforced by the UEs 10, the GW 150, or other user-plane nodes of the wireless communication network, such as transport nodes in the CN part 120 or in the RAN part.

As illustrated by double-headed arrows, the access node 100 may send DL (downlink) transmissions to the UEs, and the UEs may send UL (uplink) transmissions to the access node 100. The DL transmissions and UL transmissions may be used to provide various kinds of services to the UEs, e.g., a voice service, a multimedia service, or a data service. Such services may be hosted in the CN part 120, e.g., by a corresponding network node. Further, such services may be hosted externally, e.g., by an AF (application function) connected to the CN part 120. By way of example, FIG. 1 illustrates a service platform 180 provided outside the wireless communication network. The service platform 180 could for example connect through the Internet or some other wide area communication network to the CN part 120. The service platform 180 may be based on a server or a cloud computing system and be hosted by one or more host computers. The service platform 180 may include or be associated with one or more AFs that enable interaction of the service platform 180 with the CN part 120. The service platform 180 may provide one or more services to the UEs 10, corresponding to one or more applications. These services or applications may generate the user data traffic conveyed by the DL transmissions and/or the UL transmissions between the access node 100 and the respective UE 10. Accordingly, the service platform 180 may include or correspond to the above-mentioned network destination and/or network source for the user data traffic.

It is noted that the wireless communication network may actually include more access nodes for serving multiple cells in a similar way as explained for the access node 100 and the cell 101. Further, it is noted that in some scenarios the service platform 180 could at least in part also be provided in the CN part 120 and/or in the RAN part of the wireless communication network.

Figure 2:
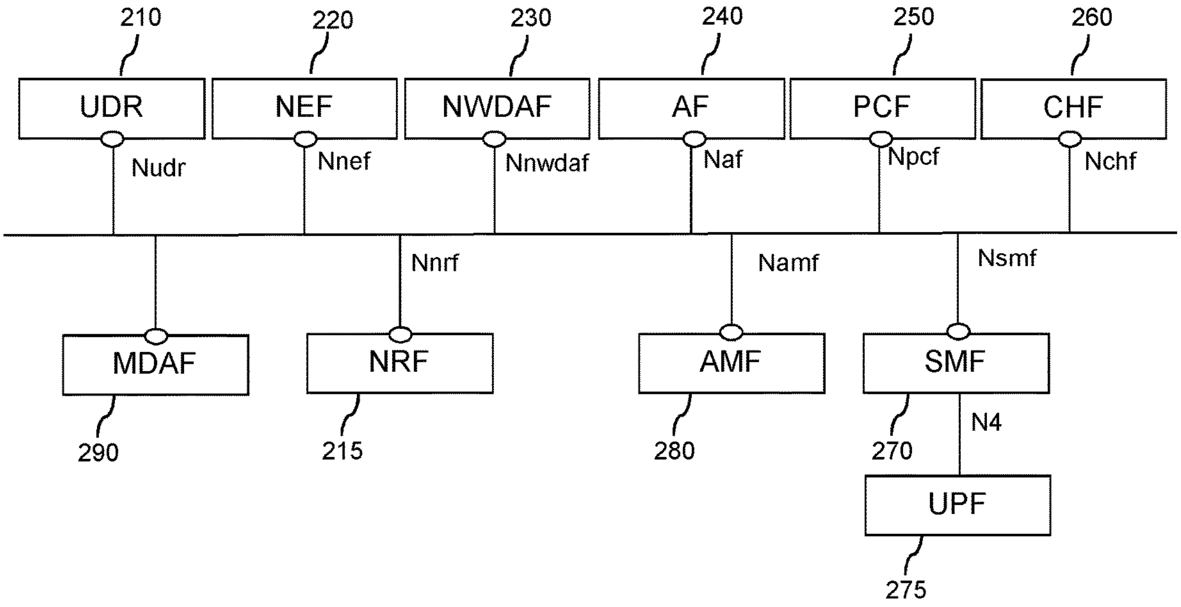
FIG. 2 schematically illustrates an exemplary network architecture as used according to an embodiment of the invention.

As mentioned above, the wireless communication network may be based on the 5G NR technology. FIG. 2 illustrates elements of a 5G CN architecture which a used in connection with the NR technology. Specifically, FIG. 2 illustrates a UDR (Unified Data Repository) 210, an NRF (Network Repository Function) 215, an NEF (Network Exposure Function) 220, an NWDAF (Network Data Analytics Function) 230, an AF (Application Function) 240, a PCF (Policy Control Function) 250, a CHF (Charging Function) 260, an SMF (Session Management Function) 270, a UPF (User Plane Function) 275, and an AMF (Access Management Function) 280. Moreover, FIG. 2 also illustrates an MDAF (Management Data Analytics Function) as an example of a Management Function (MnF) of the wireless communication network. Further, FIG. 2 also illustrates interfaces (also referred to as reference points) between these node. Specifically, these interfaces include an Nudr reference point with respect to the UDR 210, an Nnrf reference point with respect to the NRF 215, an Nnef reference point with respect to the NEF 220, an Nnwdaf reference point with respect to the NWDAF 230, an Naf reference point with respect to the AF 240, an Npcf reference point with respect to the PCF 250, an Nchf reference point with respect to the CHF 260, an Nsmf reference point with respect to the SMF 270, an N4 reference point between the SMF 270 and the UPF 275, and an Namf reference point with respect to the AMF 280.

In the context of the illustrated concepts functionalities of the AF 240 may include interaction with the CN in order to provide one or more services. This may specifically include controlling of traffic handling with respect to QoE, by providing the CN with information on the desired QoE and optionally the actual QoE experienced by the user.

In the context of the illustrated concepts functionalities of the NEF 220 may include exposure of capabilities and events. Specifically, capabilities of network nodes and events may be securely exposed to 3rd party nodes, such as a 3$^{rd}$ party AF 240. As further explained below, the functionalities of the NEF 220 may for example be used when establishing a user data session for a certain AF, which requires a certain QoE. Further, the NEF 220 may support secure provision of information from external nodes or applications to the wireless communication network and translate between network-external and network-internal information.

In the context of the illustrated concepts functionalities of the NWDAF 230 may include interaction with various entities for different purposes, such as data collection based on subscription to events provided by the AMF 280, the SMF 270, the PCF 250, UDM (Unified Data Management), the AF 240 (directly or via the NEF 220), and/or an OAM (Operations and Maintenance) system. Further, functionalities of the NWDAF 230 may include retrieval of information from data repositories, e.g., retrieval of subscriber-related information via UDM from the UDR 210. Further, functionalities of the NWDAF 230 may include retrieval of information about NFs (Network Functions), e.g., retrieval of NF-related information from the NRF 215. Further, functionalities of the NWDAF 230 may include on demand provision of analytics to consumers.

In the context of the illustrated concepts functionalities of the PCF 250 may include providing of policy rules to control plane node(s) to enforce them. Specifically, the PCF 250 may support retrieving information on QoS requested for user data traffic from the NEF 220 and installing corresponding PCC rule/s with the corresponding QoS enforcement actions towards the SMF 270.

In the context of the illustrated concepts functionalities of the UPF 275 may include: acting as a point of interconnect to an external data network, e.g., the Internet, packet routing and forwarding, packet inspection, (e.g. application detection based on service data flow template and optionally one or more PFDs (Packet Flow Descriptions) or one or more PDRs (Packet Detection Rules) provided by the SMF 270, user plane policy rule enforcement, e.g., by gating, redirection, traffic steering, and user plane QoS handling, e.g., by rate enforcement or QoS marking.

In the context of the illustrated concepts functionalities of the SMF 270 may include obtaining application-specific PCC rules from the PCF 250. The SMF 270 may also be responsible for providing and activating one or more PDRs (Packet Detection Rules) in the UPF 280 and/or for providing and activating one or more QERs (QoS Enforcement Rules) in the UPF 280. The PDR(s) may be used to identify user data traffic of a certain application and the QER(s) may then be used to indicate the requested QoS handling to the UPF 280.

In the context of the illustrated concepts functionalities of the MDAF 290 may include providing a management data analytics service for improving performance and efficiency of the wireless communication network, e.g., to accommodate and support the diversity of services and requirements. The management data analytics service may utilize the network management data collected from the wireless communication network and provide analytics based on the collected information.

Further details concerning functionalities of the illustrated nodes and reference points can for example be found in 3GPP TS 23.501 V 16.4.0. Further, details on the NWDAF can be found in 3GPP TS 23.288 V 16.3.0 (2020-03), and further details on the MDAF can be found in 3GPP TS 28.533 V 16.3.0 (2020-03).

It is noted that while FIG. 2 illustrates typical elements of a 5G CN, not all the illustrated elements are actually required for implementing the illustrated concepts. Further, it is noted that in other implementations, e.g., using a 4G CN architecture, the elements of FIG. 2 could be replaced having other designations, but similar functionalities. For example, in the illustrated concepts the GW 150 of FIG. 1 could be implemented by the UPF 280, and the controller 160 could be implemented by the SMF 270 and/or the PCF 250. In the case of a 4G CN architecture, the GW 150 could be implemented by a PGW (Packet Data Gateway) and the controller 160 could be implemented by a PCRF (Policy and Charging Rules Function).

Figure 3A:
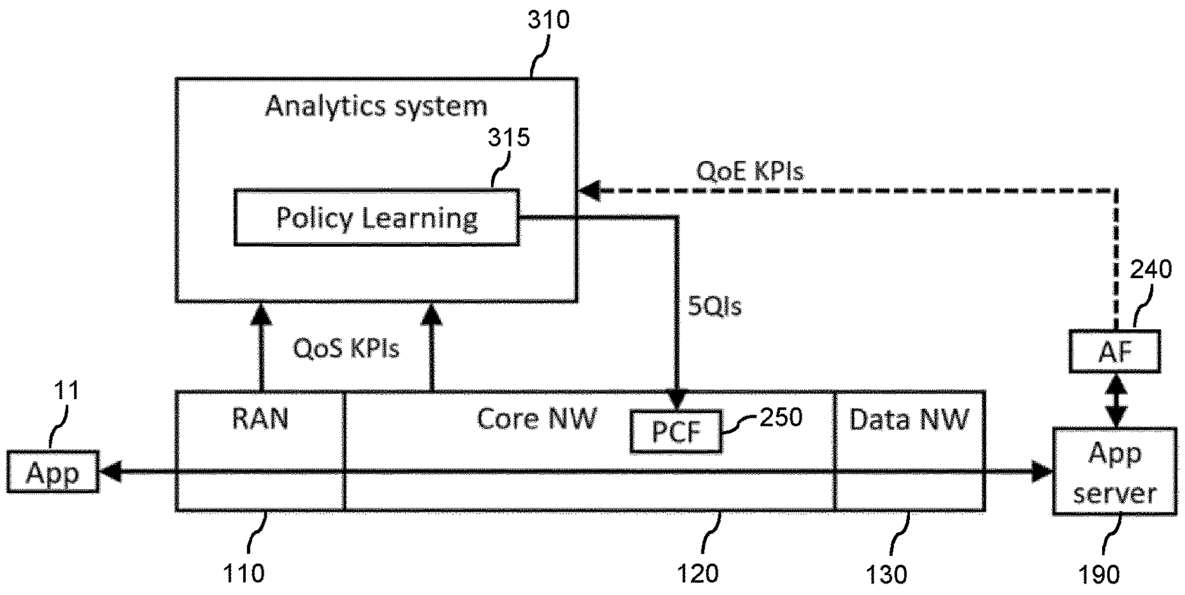
FIG. 3A schematically illustrates an management system according to an embodiment of the invention.

FIG. 3A further illustrates an exemplary architecture for implementation of the illustrated concepts. Specifically, FIG. 3A illustrates the RAN part 110 of the wireless communication network, the CN part 120 of the wireless communication network, and the analytics system 310. Although FIG. 3A illustrates the analytics system 310 as a separate element, it is noted that at least a part of the analytics system 310 could be implemented by one or more nodes of the CN part 120, e.g., by the NWDAF 230, by the MDAF 290, or by a combination of the NWDAF 230 and the MDAF 290. Further, FIG. 3A also illustrates an application server (app server) 190 and the AF 240 interacting with the application server 190. The application server 190 is assumed to provide one or more services interacting with one or more applications (app) 11 installed on one or more UEs 10. User data traffic generated by these services is illustrated by a horizontal double-headed arrow and is conveyed through the RAN part 110 and the CN part 120 of the wireless communication network. As further illustrated, the user data traffic may also be conveyed through an external data network (Data NW) 130.

In the illustrated concepts, the RAN part 110 and the CN part 120 may be used as sources for collecting the measured QoS data, e.g., in terms of QoS KPIs (Key Performance Indicators). For example, the QoS data could be obtained from reports provided by the UPF 275. Further, the QoS data could be based on network probes or virtual network probes. Further, the CN 120, in particular the AF 240, may be used as a source for collecting the QoE data, e.g., in terms of QoE KPIs. In some scenarios, at least a part of the QoE data could also be estimated from user plane KPIs, e.g., from the QoS KPIs. This could for example be achieved by applying a machine learning mechanism to deduce QoE values from measurements on user plane data. The analytics system 310 may then correlate, store and process the measured QoS data and the QoE data. In particular, these data may be provided as inputs to a policy learning module, which implements the above-mentioned determination of the traffic forwarding policies. In the example of FIG. 3A, the analytics system 310 is assumed to determine the traffic forwarding policies in terms of 5QIs. These may then be indicated to other nodes of the wireless communication network to be enforced on the user data traffic. In the example of FIG. 3A the analytics system 310 indicates the 5QIs to the PCF 250.

The policy learning module 315 may then evaluate its input data to select the optimal 5QI for a given type of the user data traffic. The selected 5QI is then indicated to the PCF 250. Indicating the selected 5QI to the PCF 250 may be accomplished in an automated manner. In some cases, the analytics system 310 may also provide the indication in terms of a recommendation to reviewed by operator personnel before being adopted by the PCF 250.

The PCF enforces the QoS policies defined by the 5QIs in the CN part 120 and in the RAN part of the wireless communication network. This typically results in a modified treatment of the user plane data traffic. This may in turn change the QoS data and the QoE data supplied to the analytics system. Accordingly, the configuration and selection of 5QIs may be controlled in a closed loop fashion.

Figure 3B:
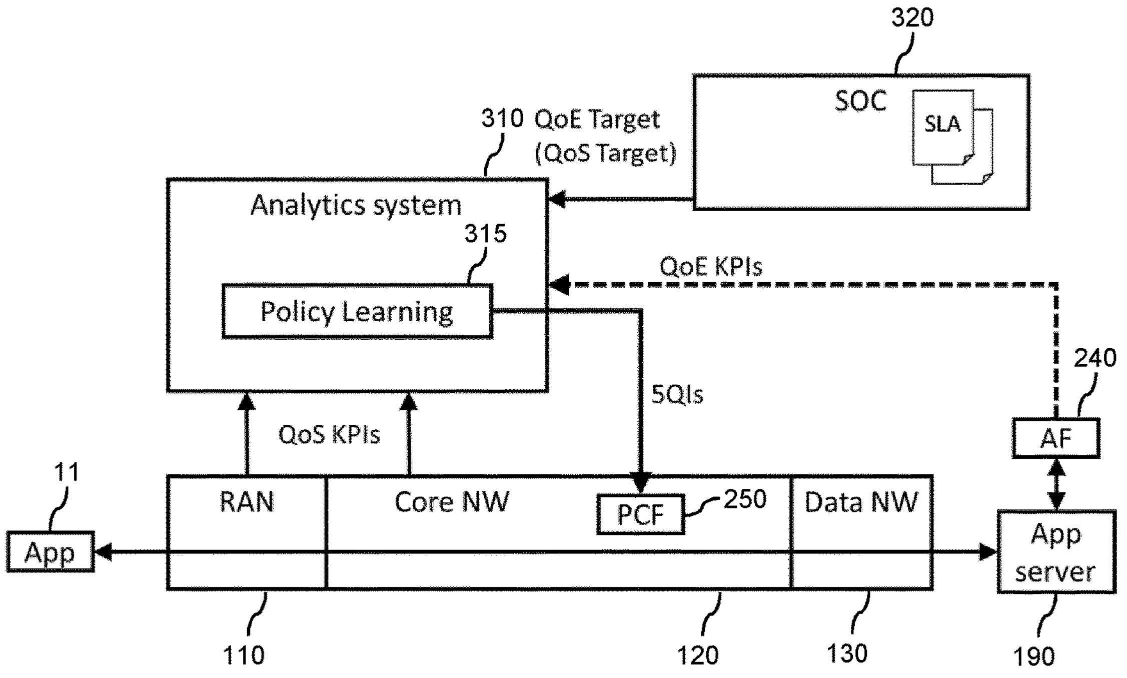
FIG. 3B schematically illustrates a further management system according to an embodiment of the invention.

The QoE data and QoE targets used as inputs of the policy learning module 315 may be obtained in various ways. In some scenarios, the QoE targets and related parameters and confidence levels may be obtained from an SOC (Service Operation Center). FIG. 3B illustrates a corresponding variant, where the SOC 320 is used to specify one or more QoE targets of user data traffic subject to an SLA between the service provider and the operator of the wireless communication network. Further, the SOC may also provide one or more QoS targets for the user data traffic subject to the SLA. QoE targets for user data traffic not subject to such SLA may be derived on the basis of business goals of the operator, e.g., by the analytics system 310 and/or provided by operator personnel. The QoE targets may be considered as non-dynamic parameters which are configured in the analytics system when the wireless communication network is configured for the service generating the user data traffic. In other words, the QoE targets are assumed to be static or subject to only infrequent changes. However, if such changes occur, the analytics system 310 may be used to consider these changes in an automated manner by determining one or more 5QIs which allow to meet the new QoE targets in a resource efficient manner.

According to one example, the QoE data can be obtained through the AF 240 from the service provider. For example, the service provider may configure a mechanism for measuring the QoE as part of the service and collect corresponding QoE data from the UEs 10. These QoE data may then be collected at the application server 190 and provided to the AF 240.

According to a further example, a group of test UEs 10 may be defined and configured to execute an application which measures and reports QoE related data to the analytics system 310. These QoE related data may be used for training a machine learning model in the analytics system 310 to estimate the QoE from the measured QoS data. The trained machine learning mode may then be used to obtain the estimated QoE for the user data traffic from the measured QoS data.

According to a further example, existing models for known types of user data traffic, e.g., MPEG-4 based video over TCP (Transmission Control Protocol) or RTP (Real-Time Transport Protocol), may be used to estimate the QoE of the user data traffic from packet probe reports obtained from the user data traffic.

In the following, the determination of the 5QI for a certain type or part of the user data traffic, e.g., for the part of the user data traffic associated with a certain service, will be explained in more detail. For these explanations, it is assumed that a number of 5QIs are configured for the purpose of serving different types of expected user data traffic. These 5QIs may include one or more standardized 5QIs and/or one or more operator-defined custom 5QIs. These pre-configured 5QIs may form a set of candidate 5QIs or a set of candidate 5QIs may be selected from the pre-configured 5QIs. For example, the set of candidate 5QIs could be selected by operator personnel, taking into account that some of the pre-configured 5QIs should be excluded for administrative or legislative reasons. For each type of the user data traffic, the operator personnel may also have a rough idea about the required QoS targets and the required priority, and this knowledge may be used to define a list of candidate 5QIs for a given type of the user data traffic. The selectable 5QIs for the different types of user data traffic may thus be limited to a list or range of 5QIs.

The illustrated concepts may then be used to determine an optimized 5QI among the set of candidate 5QIs for this type of user data traffic. In some scenarios, it is also possible to newly create a custom 5QI which has optimized characteristics for the given type of user data traffic. This may for example be accomplished using the dynamical assignment of 5QIs as described in section 5.7.1.2 of 3GPP TS 23.501 V 16.4.0.

Based on the analysis of the QoS statistics observed for the user data traffic, the analytic system may identify QoS targets, in particular target packet delay and/or target packet error rate, which are required to meet the QoE target for the user data traffic. In some cases, the analytics system may configure a new 5QI with these delay and loss targets and select this newly configured 5QI as the optimized 5QI. The priority associated with the newly configured 5QI may be set higher that the priority of best effort user data traffic with the same QoS targets. The new 5QI may be configured by signalling the QoS characteristics of the 5QI to nodes of the CN part 120 and of the RAN part 110 of the wireless communication network, e.g., using procedures as described in 3GPP TS 23.501, section 5.1.7.2.

As mentioned above, in some cases the SLA defining the QoE target may also specify one or more QoS targets for the user data traffic of the service. In this case the candidate 5QIs can determined to include all 5QIs which meet these one or more QoS targets, i.e., which define QoS targets which are at least as strict as the QoS target(s) defined by the SLA.

In the following, possible learning algorithms implemented by the policy learning module 315 will be explained in more detail. In these explanations that for a given type of the user data traffic, for which an optimized 5QI needs to be determined, a QoE target is defined by requiring QoE>=q for p % of a number of samples, where QoE denotes a value representing the QoE, with a higher value denoting a higher QoE, q denotes a target value corresponding to the QoE target, and p denotes a target percentage. These learning algorithms may be applied globally, i.e., for all cells of the wireless communication network, or for a part of the wireless communication network, e.g., per cell, per tracking area, or per any other kind of subdivision like a rural part and an urban part. When applying the learning algorithm globally, it may be easier to collect a statistically relevant amount of input data. On the other hand, applying the learning algorithms to smaller parts of the wireless communication network may help to address locally varying requirements individually.

For better illustrating the learning algorithm, a multi-dimensional representation of the obtained input data may be considered. In particular, the measured QoS data may be represented by a first subset of dimensions, in the following denoted as QoS dimensions. For example, the measured packet delay may be represented by a first QoS dimension and the measured packet error rate may be represented by a second QoS dimension. The QoS targets defined by a 5QI then define borders with respect to the corresponding QoS dimensions. The estimated QoE value may be represented by a further dimension, in the following denoted as QoE dimension, and the specified QoE target may define a border with respect to this QoE dimension. Each data record with an estimated QoE value and the related QoS data defines a point in the space defined by the QoS dimensions and the QoE dimension.

The QoS statistics considered by the learning algorithm may be based on distinguishing data records where the QoE target is met and data records where the QoE target is not met. More specifically, for a given 5QI, the data records within the borders defined by the QoS targets may be considered and used to calculate a ratio of the data records where the QoE target is met to the data records where the QoE target is not met. This ratio indicates how well the 5QI can be expected to fulfill the QoE target. In particular, a high value of the ratio indicates a high likelihood that the 5QI is going to meet the QoE target. By comparison to a threshold, e.g., of 1 or higher, the learning algorithm may then decide whether the 5QI is expected to meet the QoE target. In an alternative implementation, a percentage of the data records where the QoE target is met to all data records within the borders defined by the QoS targets may be used as an indication how well the 5QI can be expected to fulfill the QoE target.

In some scenarios the above evaluation of the QoS statistics may yield multiple 5QIs which are expected to meet the QoE target. In this case, the learning algorithm may also perform a selection among these multiple 5QIs. For example, the learning algorithm could select the 5QI with the highest value of the ratio or percentage, because it has the highest likelihood to meet the QoE target. However, in order to avoid overprovisioning and to ensure efficient resource usage, the selection may also be based on a cost function considering the amount of resources for implementing the 5QI. In particular, the cost function may be defined in such a way, that a higher number of resources required for implementing the 5QI corresponds to a higher value of the cost function. The learning algorithm may then select the 5QI with the lowest cost function.

Figure 4:
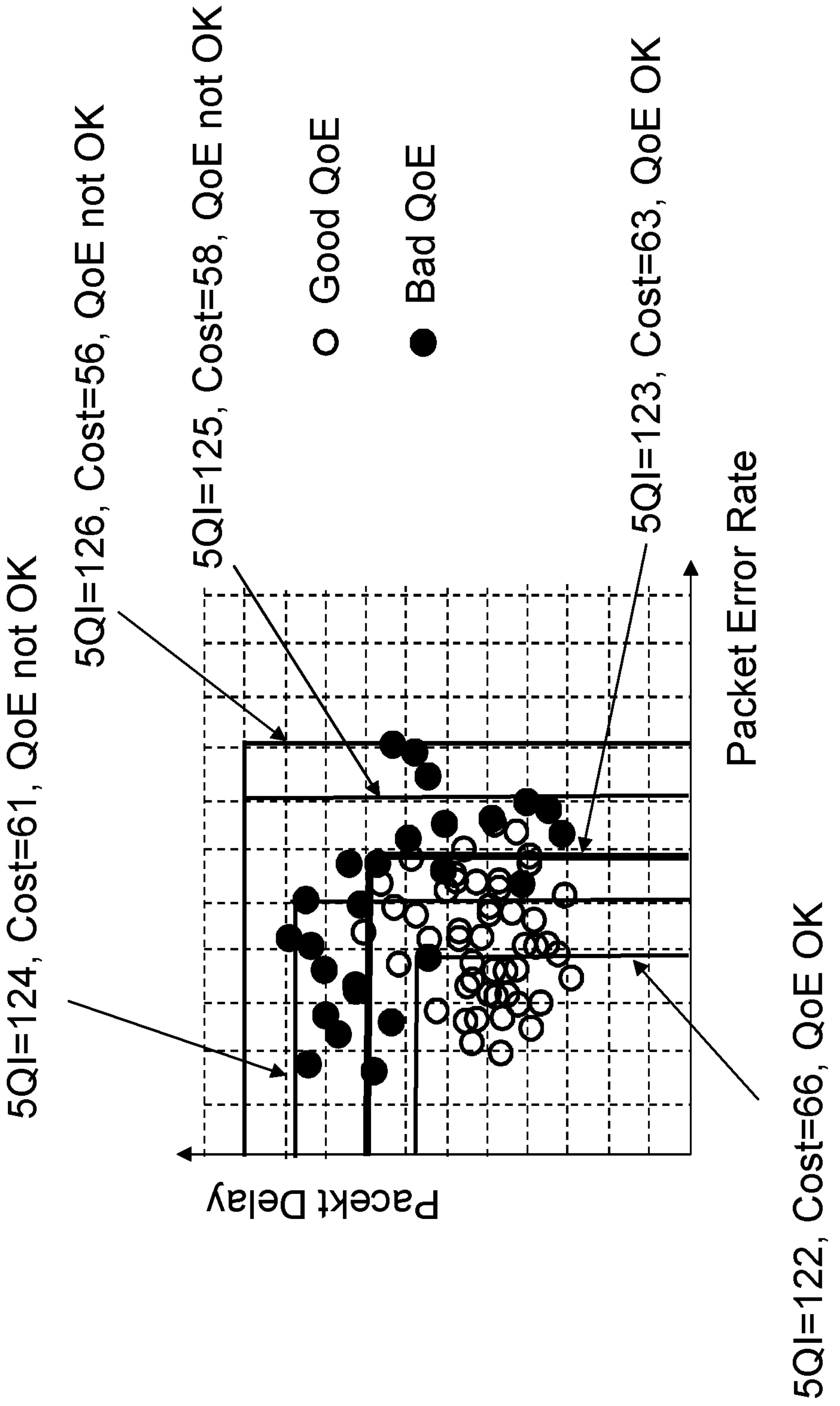
FIG. 4 shows an example of QoS data and QoE data as considered in a learning algorithm according to an embodiment.

FIG. 4 illustrates an example of such multi-dimensional representation, with the packet error rate being represented by positions along a horizontal axis, the packet delay being represented by positions along a vertical axis, good QoE being denoted by open circles, and bad QoE being denoted by solid circles. In the illustration of FIG. 4, the QoS targets of different 5QIs are illustrated by solid boxes. In the example of FIG. 4, it is assumed that the currently applied 5QI is 124, but is found to not meet the QoE target. The learning algorithm thus considers other 5QIs, namely 5QI=122, 5QI=123, 5QI=125, and 5QI=126. Among these other 5QIs, 5QI=122 and 5QI=123 are expected to meet the QoE target, which can be seen from the high percentage of open circles within the boxes corresponding to the QoS targets of these 5QIs. 5QI=125 and 5QI=126 are in turn expected to not meet the QoE target, which can be seen from the higher percentage of solid circles within the boxes corresponding to the QoS targets of these 5QIs. Because 5QI=123 has a lower value of the cost function, in the example of FIG. 4 this 5QI would be selected by the learning algorithm.

In the following, two examples of corresponding algorithms will be explained in more detail. These examples assume that the measured QoS parameters correspond to packet delay and packet error rate, and that the 5QIs each define a corresponding target packet delay and target packet error rate as QoS targets.

Example 1

This example is based on the assumption that the QoS targets defined by the 5QIs, i.e., the target packet delay and the target packet loss are always met for the user data traffic to which the 5QI is applied.

First, the candidate 5QIs may be ordered from the one with one with the lowest value of the cost function to the one with the highest value of the cost function. Starting with the candidate 5QI with the lowest value of the cost function, the algorithm may then determine the data records for which the measured packet delay is equal to or smaller than the target packet delay of the candidate 5QI and the measured packet error rate is equal to or smaller than the target packet error rate of the candidate 5QI. Next, a success percentage, i.e., a percentage of these data records where the QoE target is met, is calculated and compared to a threshold, e.g., of 0.5. If the success percentage is equal to or higher than the threshold, the candidate 5QI is selected as the optimized 5QI. Otherwise, the algorithm proceeds by repeating the above process for the candidate 5QI with the next higher number of the cost function.

Upon selecting the optimized 5QI, the selected optimized 5QI may be deployed, e.g., by indicating it to the PCF 250. If all available candidate 5QIs have been considered without selecting an optimized 5QI, the algorithm may report a failure.

Example 2

This example is based on the assumption that the QoS targets defined by the 5QIs, i.e., the target packet delay and the target packet loss are not always met for the user data traffic to which the 5QI is applied, i.e., that there may be violations of the QoS targets.

In this case, the algorithm may first determine the data records for which the QoS targets of the currently applied 5QI are not met, i.e., the measured packet delay is higher than the target packet delay of the candidate 5QI and the measured packet error rate is higher than the target packet error rate of the candidate 5QI. If a percentage V of these violating data records in an evaluation time window is higher than a threshold, the algorithm may report this violation of the QoS targets, e.g., with the aim of enabling root cause analysis.

the candidate 5QIs may be ordered from the one with one with the lowest value of the cost function to the one with the highest value of the cost function. Starting with the candidate 5QI with the lowest value of the cost function, the algorithm may then determine the data records for which the measured packet delay is equal to or smaller than the target packet delay of the candidate 5QI and the measured packet error rate is equal to or smaller than the target packet error rate of the candidate 5QI, with a set of these data records in the evaluation time window being denoted by Ni. A set of all other data records in the evaluation time window is denoted by No. Further, a first success percentage S1 is determined as the percentage of the data records in Ni where the QoE target is met. A second success percentage S2 is determined as the percentage of the data records in No where the QoE target is met. An overall success percentage may then be calculated as $S=S1*(1-V)+S2*V$ and compared to a threshold, e.g., of 0.5. If the overall success percentage is equal to or higher than the threshold, the candidate 5QI is selected as the optimized 5QI. Otherwise, the algorithm proceeds by repeating the above process for the candidate 5QI with the next higher number of the cost function.

Upon selecting the optimized 5QI, the selected optimized 5QI may be deployed, e.g., by indicating it to the PCF 250. If all available candidate 5QIs have been considered without selecting an optimized 5QI, the algorithm may report a failure.

The algorithms of example 1 and example 2 allow for improving the QoE and/or efficiency of resource usage. In many of the cases they may find the optimized 5QI in one iteration. Otherwise, they may find the optimized 5QI within very few iterations.

Figure 5:
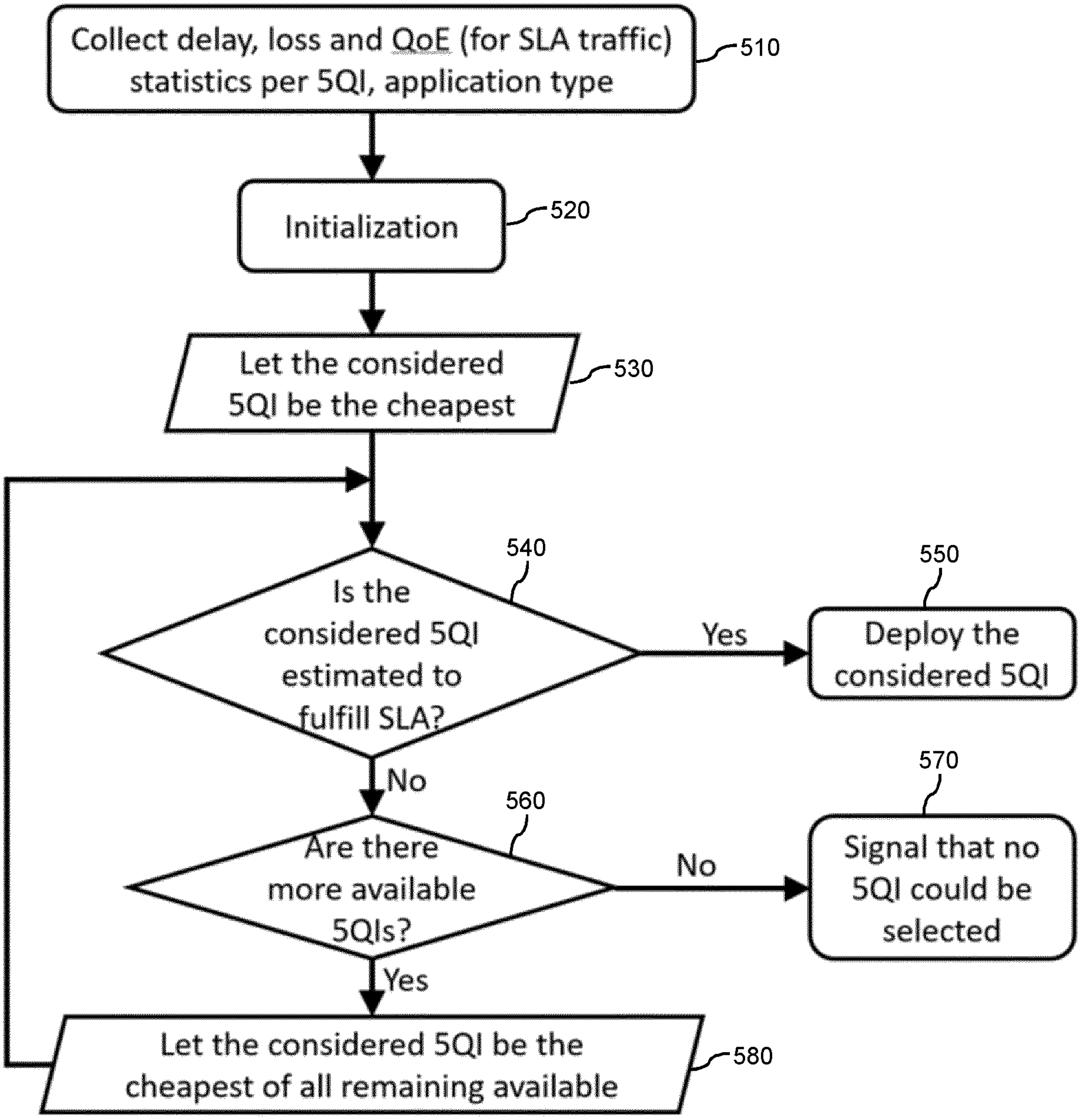
FIG. 5 illustrates an example of processes as utilized according to an embodiment of the invention.

FIG. 5 shows a flowchart for illustrating an algorithm corresponding to example 1 or example 2. The processes of FIG. 5 may for example be implemented by the analytics system 310.

At block 510, the required statistics are collected. In particular, measured packet delays, measured packet error rates, and associated estimated QoE levels are collected per 5QI and type of the user data traffic, e.g., per application type.

At block 520, the optimization algorithm is initialized. This may for example involve determining the candidate set of 5QIs, determining the cost function, and calculating the value of the cost function for each of the candidate 5QIs.

At block 530, the algorithm selects the cheapest available candidate 5QI, i.e., the candidate 5QI among the candidate 5QIs which has the lowest value of the cost function.

At block 540, the algorithm checks if the currently considered 5QI is expected to meet the given QoE target, e.g., the QoE target defined by an SLA. If this is the case, the algorithm proceeds to block 550 to deploy the currently considered 5QI. Otherwise, the algorithm proceeds to block 560 to check if there are further candidate 5QIs available, which have not yet been considered by the algorithm. If this is not the case, the algorithm proceeds to block 570 to indicate that no optimized 5QI could be selected. Otherwise the algorithm proceeds to block 580 to select the next candidate 5QI to be considered. In particular, the algorithm selects the cheapest one among the still remaining candidate 5QIs and returns to block 540.

As mentioned above, in some scenarios the determination of the optimized 5QI may also involve newly configuring the optimized 5QI. In this case, the QoS targets for the newly configured 5QI may be derived from the collected QoS statistics. The QoS targets of the newly configured 5QI may be determined from the measured QoS parameters of data records where the QoE target is met. For example, the target packet delay may be set to the highest packet delay observed for a data record where the QoE target is met, and the target packet error rate may be set to the highest packet error rate observed for a data record where the QoE target is met. The priority of the newly configured 5QI may be set, e.g., to be the same as that of the closest 5QI for which QoE target is fulfilled. Of course, further rules and criteria may be considered as well when deriving the characteristics of the newly configured 5QI. As a result, the algorithm may provide a 5QI and its associated characteristics, e.g., in terms of target packet delay, target packet error rate, and priority and inform the PCF 250 accordingly. Signalling of the newly defined 5QI to nodes of the CN part 120 and of the RAN part 110 may be based on procedures as defined in 3GPP TS 23.501 V 16.4.0, section 5.7.1.2. In some scenarios, rather than newly configuring a 5QI, it would also be possible to reconfigure an existing 5QI, e.g., by modifying its target packet delay, target packet error rate, and/or priority.

Once the optimized 5QI has been determined, later introduced changes may still result in this 5QI being non optimal at a later stage. For example, a certain service may introduce usage of another video codec that is more tolerant to packet losses, with the effect that the current 5QI consumes more resources than necessary. This may be addressed by continuously selecting a subset of user data sessions where the above procedure of determining the optimized 5QI is applied, with the aim of checking if another 5QI would likely give a better overall result. Of course, it would also be possible to continuously or intermittently apply the procedure of determining the optimized 5QI to all user data traffic.

Figure 6A:
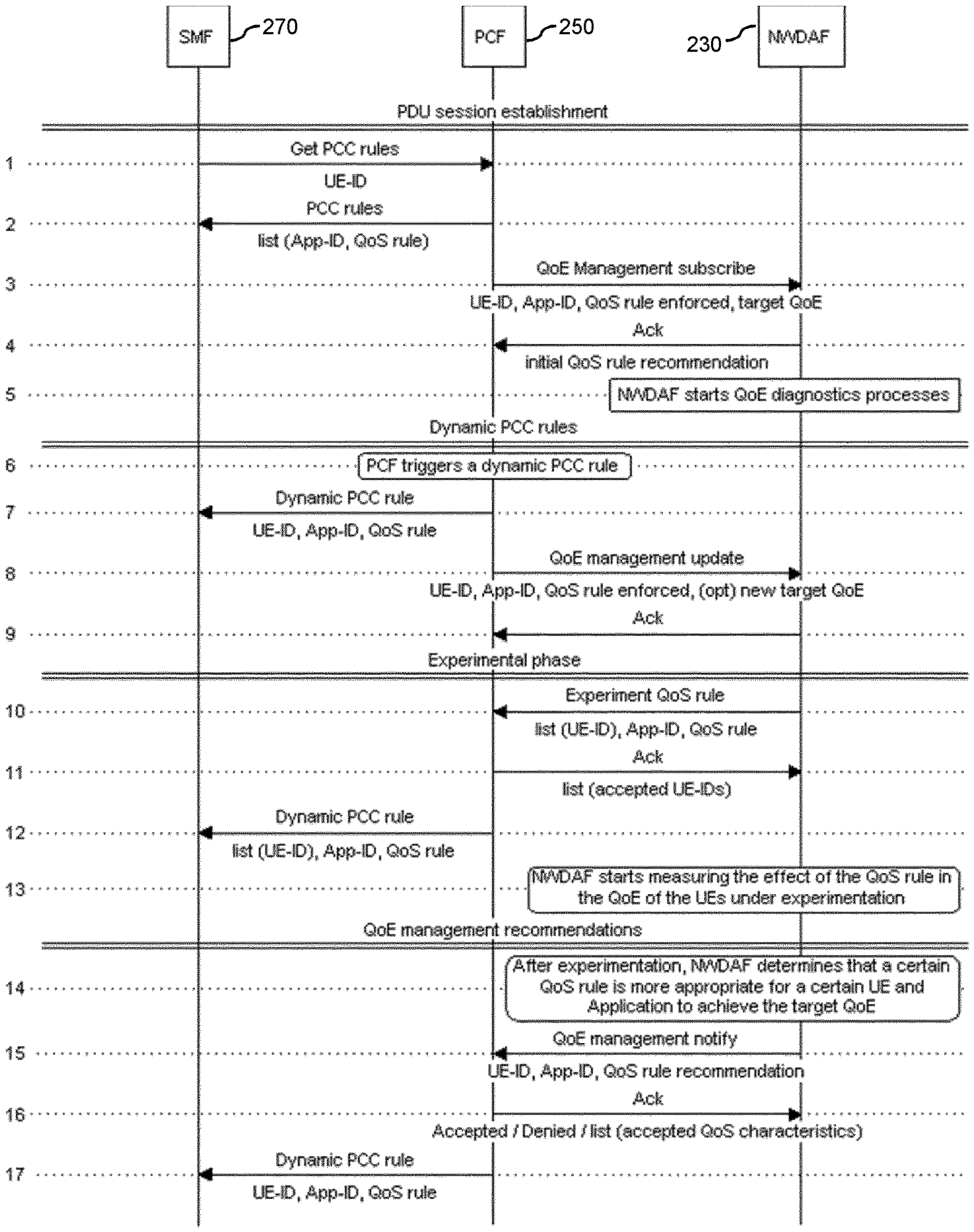
FIG. 6A illustrates an exemplary message exchange according to an embodiment of the invention.
Figure 6B:
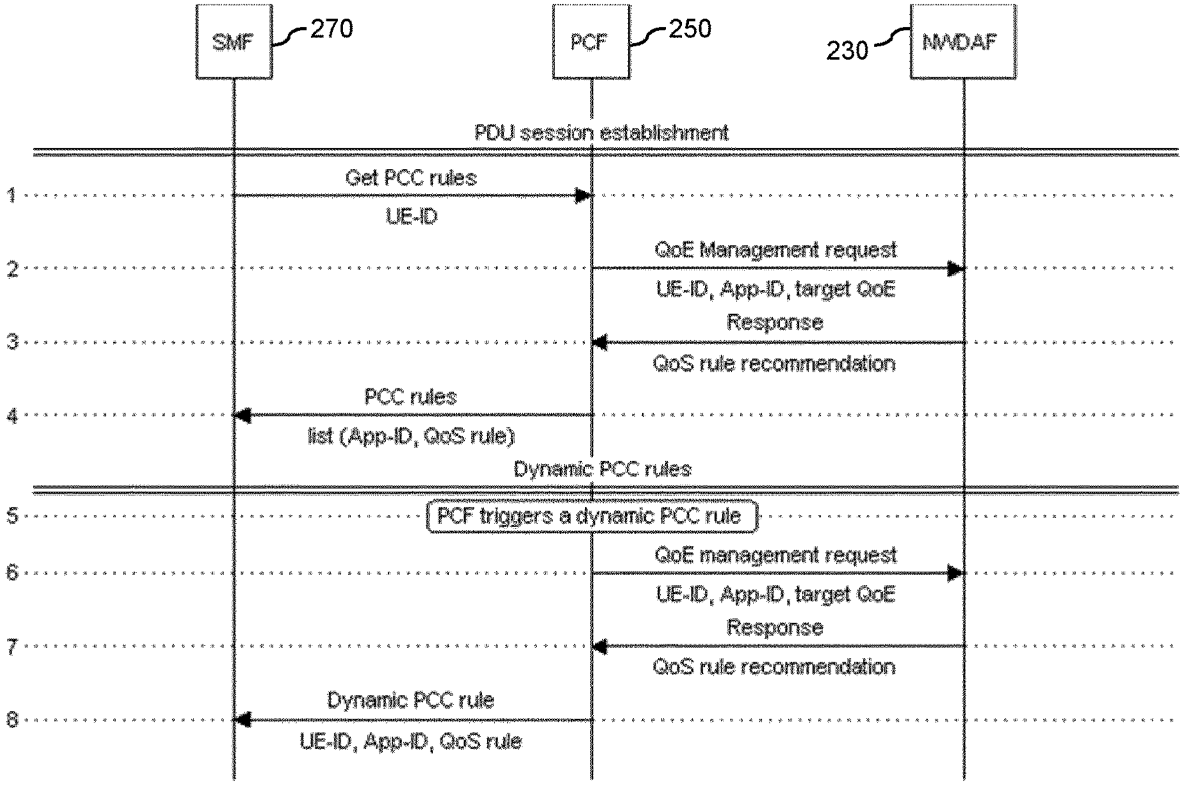
FIG. 6B illustrates a further exemplary message exchange according to an embodiment of the invention.

In some scenarios, the QoE data may also be obtained from interaction of the NWDAF 230 with other nodes of the wireless communication network utilizing causal inference analytics. Examples of corresponding processes are illustrated in FIGS. 6A and 6B. In these processes, the NWDAF 230 may implement a service denoted as "QoE management service" to provide QoE management recommendations to PCF 250. The PCF 250 can subscribe to the QoE management service on a per UE basis, e.g., at PDU session establishment, when providing the QoS rules that are to be enforced for each UE, and the target QoE value that shall be achieved. The PCF 250 can also use the QoE management service provided by the NWDAF 230 to update the QoS rules and/or the target QoE when dynamically provisioning PCC (Policy and Charging Control) rules. The NWDAF 230 can request the PCF 250 to trigger causal inference experiments to test certain QoS rules and analyze the impact on the QoE. The QoS statistics and estimated QoE values may then be used to determine suitable QoS rules which enable achieving the target QoE, e.g., using the above procedures for determining the optimized 5QI. The NWDAF 230 may then recommend or otherwise indicate the optimized 5QI corresponding to the determined QoS rules to the PCF 250. In some scenarios, the PCF 250 may also request such QoE management recommendations using a request/response type interaction with the NWDAF 230.

FIG. 6A shows an example of a procedure in which the PCF 230 uses a subscribe/notify type of interaction with the NWDAF 230 to request QoE management recommendations from the NWDAF 230 and the NWDAF 230 initiates experiments related to QoS rules via the PCF 250 to obtain the required QoE data and QoS data. The procedure of FIG. 6A involves the NWDAF 230, the PCF 250, and the SMF 270.

Step (1): During PDU session establishment, the SMF 270 sends to the PCF 250 a request to get the PCC rules for a UE identified by a UE-ID (UE identifier).

Step (2): The PCF 250 responds to the SMF 270 with the PCC rules. These include the QoS rule(s) to be enforced for the UE-ID on a per application basis, i.e., per application, with the application being identified by an App-ID (application identifier).

Step (3): The PCF 250 sends to the NWDAF 270 a message to subscribe to the QoE management service. This message includes the UE-ID, the App-ID, and the QoS rule(s) enforced for the UE identified by the UE-ID and the application identified by the App-ID. Each QoS rule may consist of one or more QoS characteristics, e.g., defined in terms of a GBR (guaranteed bitrate), MBR (maximum bitrate), PDB (packet delay budget), MPER (maximum packet error rate), MDBV (maximum data burst volume), or the like. Further, the message includes the target QoE for the UE and the application. The target QoE can be set to maximize the QoE or to maintain a medium QoE value so that the end user is moderately satisfied without consuming too much network resources.

Step (4) The NWDAF 230 sends to the PCF 250 a message to acknowledge the subscription. This message may optionally include a first recommendation for the QoS rules to apply for the UE and application to achieve the target QoE. In some cases, the message may include several QoS rule recommendations along with a preference indication.

Step (5): The NWDAF 230 starts the QoE diagnostics processes for the UE and the application considering the provided QoS rule and the measured QoS parameters over the network traffic.

Step (6): Due to various reasons, at some time the PCF 250 may a trigger a dynamic PCC rules procedure to update QoS rules and other policy control related parameters.

Step (7): During the dynamic PCC rules procedure, the PCF 250 sends a dynamic PCC rule to the SMF 270, including the UE-ID, App-ID and the updated QoS rule(s).

Step (8): The PCF 250 sends a QoE management update message to NWDAF 230. The QoE management update message includes the UE-ID, the App-ID, and the updated QoS rule(s) for the UE and application. Optionally, the QoE management update message may also include an updated QoE target for the UE and application.

Step (9): The NWDAF 230 sends a message to the PCF 250 to acknowledge the update. As further illustrated, the NWDAF 230 may trigger an experimentation phase, where certain UEs and/or applications are selected as treatment/experimental group to test certain QoS rules and analyze the impact on the observed QoE. Then these observations can be used to determine the optimized QoS rules to enforce in order to achieve a certain target QoE, e.g., by determining an optimized 5QI as described above. In the example of FIG. 6A, the experimentation phase involves steps (10), (11), (12), and (13).

Step (10): The NWDAF 230 sends to the PCF 250 a message requesting the experimentation of one or more probe QoS rules. The message includes a list of UE-IDs to identify UEs selected as probe set of UEs. The App-ID identifying the application to which the probe QoS rule(s) apply. The probe QoS rule(s), typically defined in terms of one or more QoS characteristics like GBR, MBR, PDB, MBER, MDBV, or the like.

Step (11): The PCF 250 responds to the request with a message including the list of accepted UE-IDs to apply the probe QoS rule(s).

Step (12): The PCF 250 sends a dynamic PCC rule to the SMF 270 including the list of UE-IDs, the App-ID and the probe QoS rule(s).

Step (13): The NWDAF 230 starts measuring the effect of the probe QoS rule(s) on the QoE of the probe set of UEs.

Step (14): After the experimentation phase and based on evaluation of the obtained QoS data and QoE data, the NWDAF 230 determines one or more QoS rules which are suitable for a certain UE and application to achieve the target QoE.

Step (15): The NWDAF 230 sends to the PCF 250 a QoE management notify message. The QoE notify message includes the UE-ID, the App-ID, and the recommended QoS rule(s), e.g., im terms of a 5QI. In some scenarios, the QoE management notify message may include several QoS rule recommendations along with respective identifiers and a preference indication.

Step (16): The PCF 250 responds to the QoE management notify message by indicating one of the following possible outcomes: A. The QoS rule recommendation is accepted. B. The QoS rule recommendation is denied. C. The QoS rule recommendation is partially accepted, indicating a set of QoS characteristics that are accepted. If several QoS rule recommendations are provided in the QoE management notify message, the PCF 250 may also indicate the ID of the QoS rule that is accepted.

Step (17): In case the recommendation is accepted or partially accepted, the PCF 250 sends a dynamic PCC rule to SMF 270. The dynamic PCC rule includes the UE-ID, the App-ID and the QoS rule including the accepted QoS characteristics.

It is noted that in the example of FIG. 6A the procedures of the PDU session establishment phase, the dynamic PCC rules procedure, and the experimentation phase could also be performed separately from each other. Further, the experimentation phase could also be performed after the PDU session establishment phase.

FIG. 6B shows an example of a procedure in which the PCF 230 uses a request/response type of interaction with the NWDAF 230 to request QoE management recommendations from the NWDAF 230. The procedure of FIG. 6B involves the NWDAF 230, the PCF 250, and the SMF 270.

Step (1): During PDU session establishment, the SMF 270 sends to the PCF 250 a request to get the PCC rules for a UE identified by a UE-ID.

Step (2): The PCF 250 sends to the NWDAF 230 a message to request the QoE management service. This message includes the UE-ID, the App-ID, and the target QoE for the UE and application. The target QoE can be set to maximize the QoE or to maintain a medium QoE value so that the end user is moderately satisfied without consuming too much network resources.

Step (3): The NWDAF 230 to the request by sending a response including a recommendation for the QoS rule(s) to apply for the UE and application to achieve the target QoE.

Step (4): The PCF 250 responds to the SMF 270 with PCC rules, including the QoS rule(s) to enforce for the UE-ID and the Application.

Step (5): Due to various reasons, at some time the PCF 250 may a trigger a dynamic PCC rules procedure to update QoS rules and other policy control related parameters.

Step (6): The PCF 250 sends to the NWDAF 230 a message to request the QoE management service. This message includes the UE-ID, the App-ID, and the target QoE for the UE and application. The target QoE can be set to maximize the QoE or to maintain a medium QoE value so that the end user is moderately satisfied without consuming too much network resources.

Step (7): The NWDAF 230 to the request with a message including the recommendation for the QoS rule(s) to apply for the UE and application to achieve the target QoE.

Step (8): The PCF 250 sends the dynamic PCC rule to SMF 270. The dynamic PCC rule includes the UE-ID, App-ID and the QoS rule(s).

It is noted that in the example of FIG. 6B the procedures of the PDU session establishment phase and the dynamic PCC rules procedure could also be performed separately from each other. Further, these procedures could also be combined with an experimentation phase as explained in connection with FIG. 6A. This experimentation phase could be performed after the PDU session establishment phase or after the dynamic PCC rules procedure. Further, a recommendation phase as explained in connection with FIG. 6A could be performed after the experimentation phase.

As can be seen, the processes of FIG. 6A or 6B may be used for providing an efficient QoE diagnostics and QoE management mechanisms in the wireless communication network. The obtained QoE data may be used to determine optimized 5QIs based on the above-described procedures. However, the obtained QoE data could also be used for other purposes, e.g., for analyzing causes of bad QoE and triggering corrective actions. These procedures may be applied to standard QoS rules or standard QoS characteristics, but also to proprietary QoS rules or proprietary QoS characteristics. Further, the procedures may be used to provide an autonomous QoE management mechanism, which avoids human intervention.

Figure 7:
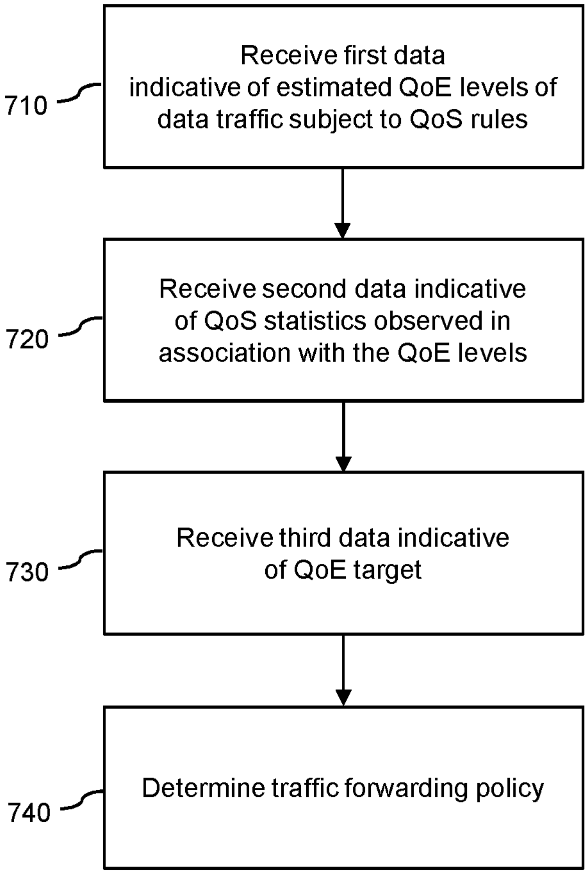
FIG. 7 shows a flowchart for illustrating a method according to an embodiment of the invention.

FIG. 7 shows a flowchart for illustrating a method of controlling user data traffic in a wireless communication network. The method of FIG. 7 may be utilized for implementing the illustrated concepts in a node of the wireless communication network. The node may implement an analytics system or at least a part of functionalities of an analytics system, such as the above-mentioned analytics system 310. In some scenarios, the node may correspond to an NWDAF or an MDAF of the wireless communication network.

If a processor-based implementation of the node is used, at least some of the steps of the method of FIG. 7 may be performed and/or controlled by one or more processors of the node. Such node may also include a memory storing program code for implementing at least some of the below described functionalities or steps of the method of FIG. 7.

At step 710, the node of the wireless communication network receives first data indicative of estimated QoE levels of data traffic in the wireless communication network. The data traffic is subject to QoS rules enforced by one or more nodes of the wireless communication network. The QoS rules may for example be enforced with the aim of meeting one or more QoS targets, e.g., target packet delay and/or target packet error rate. The data traffic may for example be data traffic of a certain service or application, e.g., data traffic between an application running on a UE and an application server.

At step 720, the node receiving second data indicative of QoS statistics observed in association with the QoE levels. For example, the second data may include measured QoS parameters like packet delays or packet error rates.

In some scenarios, the second data may also be indicative of the QoS rules applied to the data traffic while observing the QoS statistics.

In some scenarios, the node may determine a probe set of one or more QoS rules and at least a part of the first data and of the second data may be based on the data traffic being subject to probe set of QoS rules. If the data traffic relates to a plurality of users, the probe set of QoS rules may be applied for only a subgroup of the users. An example of corresponding procedures is explained in connection with FIGS. 6A and 6B, in particular in connection with the experimentation phase of FIG. 6A.

The node may receive the first data and/or the second data from one or more further nodes of the wireless communication network. The one or more further nodes may include at least one node of an access network part of the wireless communication network, such as the above-mentioned access node 100 or a transport node in the RAN part 110 of the wireless communication network. For example, the node may receive at least a part of the second data from such node of the access network part.

Further, the one or more further nodes may include at least one node of a CN part of the wireless communication network. For example, the node may receive at least a part of the first data from a node implementing an AF of the wireless communication network, e.g., like illustrated in the example of FIGS. 3A and 3B. Further, the node may receive at least of the second data from one or more nodes of the CN part of the wireless communication network, such as the above-mentioned gateway 150 or controller 160. In some scenarios, the one or more further nodes providing the second data may include a UPF and/or a PCF. In some scenarios, the one or more further nodes providing the second data may include a PGW and/or a PCRF.

At step 730, the node may receive third data indicative of a QoE target for the data traffic. The node may receive the third data from a provider of a service or application that causes the data traffic.

At step 740, the node determining a traffic forwarding policy for the data traffic. The node determines the traffic forwarding policy based on the first data and the second data to define QoS rules which, according to the observed QoS statistics, are expected to ensure that a QoE target is met. The QoE target may for example be indicated by the third data received at step 730. In other scenarios, the QoE target could also be derived by the node itself or be based on manual operator inputs.

For determining the QoS rules of the traffic forwarding policy, the node may evaluate the second data to determine whether QoS targets of the QoS rules are met. Further, the node may evaluate whether, for data records where the QoS targets of the QoS rules are met, the first data indicate that the QoE target is met, i.e., whether the estimated QoE level of the first data meets the QoE target. On the basis of these data records, the node can then determine whether certain QoS rules, in particular the QoS targets to be met by the QoS rules, are expected to ensure that the QoE target is met. For example, the node may determine a target packet delay and a target packet error rate which can be expected to ensure that the QoE target is met. In some scenarios, the traffic forwarding policy may be determined in terms of a 5QI.

If multiple traffic forwarding policies, e.g., multiple 5QIs, are configured in the wireless communication network, determining the traffic forwarding policy at step 740 may involve assigning the data traffic to one of the configured traffic forwarding policies, e.g., by configuring a mapping of data traffic types to the configured traffic forwarding policies.

If multiple traffic forwarding policies are configured in the wireless communication network, each of these traffic forwarding policies may define one or more QoS targets, e.g., a target packet delay and target packet error rate. In this case, step 740 may involve that, based on the second data, the node determines whether the QoS targets defined by the multiple traffic forwarding policies are met. This may be used as a basis for selecting that traffic forwarding policy among the configured ones which defines the most appropriate QoS rules.

In some scenarios, step 740 may also involve reconfiguring at least some of the traffic forwarding policies, e.g., by modifying one or more of the QoS targets, and assigning the data traffic to one of reconfigured traffic forwarding policies.

In some scenarios, step 740 may also involve configuring a new traffic forwarding policy in the wireless communication network and assigning the data traffic to the newly configured traffic forwarding policy.

Having determined the QoS rules of the traffic forwarding policy, the node may indicating the QoS rules to one or more other nodes of the wireless communication network. For example, the one or more other nodes comprise a node implementing a PCRF of the wireless communication network and/or a node implementing a PCF of the wireless communication network, e.g., like illustrated in the examples of FIGS. 3A, 3B, 4, 5, and 6. In some scenarios, the node may indicate the QoS rules in response to a respective request from each of the one or more other nodes, e.g., as explained in connection with the examples of FIGS. 6A and 6B. In these examples, the request may correspond to the QoE management subscribe message, the QoE management update message, or the QoE management request message. As can be seen from the example of FIG. 6A, the request may also indicate at least a part of the QoS rules enforced on the data traffic.

Figure 8:
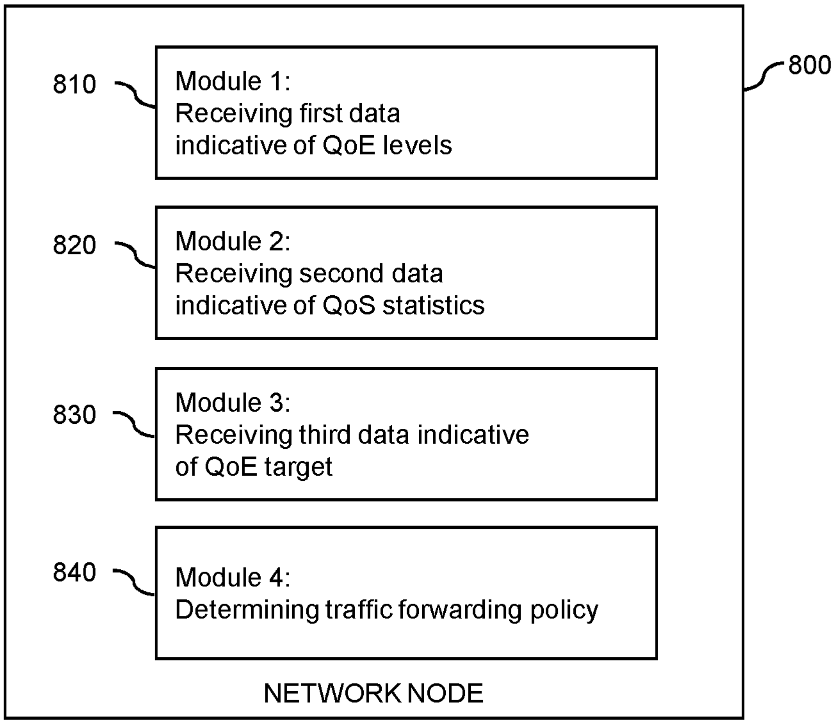
FIG. 8 shows an exemplary block diagram for illustrating functionalities of a network node implementing functionalities corresponding to the method of FIG. 7.

FIG. 8 shows a block diagram for illustrating functionalities of a network node 800 which operates according to the method of FIG. 7. The network node 800 may for example implement an analytics system or at least a part of functionalities of an analytics system, such as the above-mentioned analytics system 310. In some scenarios, the node may correspond to an NWDAF, to an MDAF of the wireless communication system, or to a combination of an NWDAF and an MDAF. As illustrated, the network node 800 may be provided with a module 810 configured to receive first data indicative of estimated QoE levels, such as explained in connection with step 710. Further, the network node 800 may be provided with a module 820 configured to receive second data indicative of QoS statistics observed in association with the estimated QoE levels, such as explained in connection with step 720. Further, the network node 800 may optionally be provided with a module 830 configured to receive third data indicative of a QoE target, such as explained in connection with step 730. Further, the network node 800 may be provided with a module 840 configured to determine a traffic forwarding policy, such as explained in connection with step 740.

It is noted that the network node 800 may include further modules for implementing other functionalities, such as known functionalities of an analytics system or of a NWDAF or MDAF. Further, it is noted that the modules of the network node 800 do not necessarily represent a hardware structure of the network node 800, but may also correspond to functional elements, e.g., implemented by hardware, software, or a combination thereof.

Figure 9:
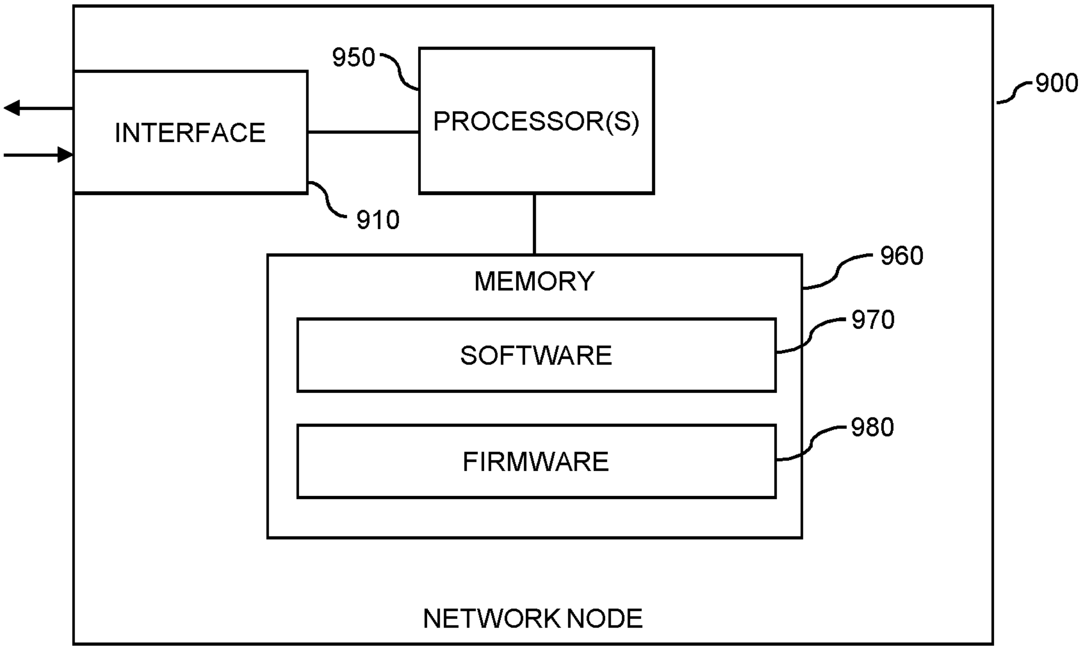
FIG. 9 schematically illustrates structures of a node according to an embodiment of the invention.

FIG. 9 illustrates a processor-based implementation of a network node 900 which may be used for implementing the above-described concepts. For example, the structures as illustrated in FIG. 9 may be used for implementing any of the analytics system implementing the illustrated concepts, like the analytics system 310, an NWDAF implementing the illustrated concepts, like the NWDAF 230, or an MDAF implementing the illustrated concepts, like the MDAF 290. In some scenarios, also a system of multiple network nodes 900 with structures as illustrated in FIG. 9 may be used implementing the above-described concepts.

As illustrated, the network node 900 includes one or more interfaces 910. These interfaces 910 may for example be used for enabling communication with one or more other nodes. The interfaces 910 may for example be used for implementing one or more of the reference points shown in FIG. 2.

Further, the network node 900 may include one or more processors 950 coupled to the interface(s) 910 and a memory 960 coupled to the processor(s) 950. By way of example, the interface(s) 910, the processor(s) 950, and the memory 960 could be coupled by one or more internal bus systems of the network node 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970 and/or firmware 980. The memory 960 may include suitably configured program code to be executed by the processor(s) 950 so as to implement the above-described functionalities of a network node, such as explained in connection with FIGS. 7 and 8.

It is to be understood that the structures as illustrated in FIG. 9 are merely schematic and that the network node 900 may actually include further components which, for the sake of clarity, have not been illustrated, e.g., further interfaces or processors. Also, it is to be understood that the memory 960 may include further program code for implementing known functionalities of a network node, e.g., known functionalities of an NWDAF or MDAF of a 3GPP network. According to some embodiments, also a computer program may be provided for implementing functionalities of the network node 900, e.g., in the form of a physical medium storing the program code and/or other data to be stored in the memory 960 or by making the program code available for download or by streaming.

As can be seen, the concepts as described above may be used for efficiently managing QoE targets. For example, it is possible to ensures QoE targets specified in an SLA or otherwise determined QoE targets in an automated manner. If the QoE targets are violated with the currently applied traffic forwarding policy, a more appropriate traffic forwarding policy may be determined that provides better QoS in order to meet the QoE target. On the other hand, a traffic forwarding policy requiring excessive resources may be replaced by an optimized traffic forwarding policy that requires less resources but still allows to meet the QoE target. The applied traffic forwarding policy may thus be adapted to various changes that may occur, including changes in structure or topology of the wireless communication network or changes in the data traffic subject to the traffic forwarding policy. The traffic forwarding policy may be determined with to provide optimized packet level characteristics like maximum packet delay, maximum packet error rate loss, maximum jitter, or priority.

It is to be understood that the examples and embodiments as explained above are merely illustrative and susceptible to various modifications. For example, the illustrated concepts may be applied in connection with various wireless communication network technologies, without limitation to the NR technology.

Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A method of controlling user data traffic in a wireless communication network, the method comprising:

a node of the wireless communication network receiving first data indicative of estimated Quality of Experience (QoE) levels of data traffic in the wireless communication network, the data traffic being subject to Quality of Service (QOS) rules enforced by one or more nodes of the wireless communication network, wherein the data traffic relates to a plurality of users;

the node receiving second data indicative of QOS statistics observed in association with the QoE levels;

based on the first data and the second data, the node determining a traffic forwarding policy for the data traffic, the traffic forwarding policy being expected to ensure that a QoE target is met; and the node determining a set of one or more QoS rules, wherein at least a part of the first data and of the second data are based on the data traffic being subject to the set of QOS rules, and the set of QOS rules is applied for only a subgroup of the plurality of users.

2. The method of claim 1, wherein multiple traffic forwarding policies are configured in the wireless communication network and determining the traffic forwarding policy comprises assigning the data traffic to one of the configured traffic forwarding policies.

3. The method of claim 2, wherein the traffic forwarding policies each define one or more QoS targets.

4. The method of claim 3, comprising:

based on the second data, the node determining whether the QoS targets are met.

5. The method of claim 2, wherein the QoS targets comprise a target packet delay.

6. The method of claim 2, wherein the QoS targets comprise a target packet error rate.

7. The method of claim 1, comprising:

the node receiving third data indicative of the QoE target from a provider of a service that causes the data traffic.

8. The method of claim 1, wherein determining the traffic forwarding policy comprises reconfiguring at least some of the traffic forwarding policies and assigning the data traffic to one of reconfigured traffic forwarding policies.

9. The method of claim 1, wherein determining the traffic forwarding policy comprises configuring a new traffic forwarding policy in the wireless communication network and assigning the data traffic to the newly configured traffic forwarding policy.

10. The method of claim 1, wherein the second data are further indicative of the QoS rules applied to the data traffic while observing the QoS statistics.

11. A non-transitory computer readable storage medium storing a computer program comprising program code to be executed by at least one processor of a node for a wireless communication network, wherein execution of the program code causes the node to perform the method of claim 1.

12. The method of claim 1, comprising:

the node receiving the first data and the second data from one or more further nodes of the wireless communication network, wherein the one or more further nodes comprise at least one node of an access network part of the wireless communication network.

13. The method of claim 12, wherein the one or more further nodes comprise at least one node of a core network part of the wireless communication network, and the node receives the first data from a node implementing an Application Function of the wireless communication network.

14. The method of claim 1, comprising:

the node indicating the QoS rules to one or more other nodes of the wireless communication network.

15. The method of claim 14, wherein the one or more other nodes comprise a node implementing a Policy and Charging Rules Function (PCRF) of the wireless communication network or a node implementing a Policy Control Function of the wireless communication network.

16. The method of claim 14, wherein the node indicates the QoS rules in response to a respective request from each of the one or more other nodes, and the request indicates at least a part of the QoS rules enforced on the data traffic.

17. The method of claim 1, wherein the node implements a Network Data Analytics Function of the wireless communication network, or the node implements a Management Data Analytics Function of the wireless communication network.

18. A node for a wireless communication network, the node comprising:

a receiver for receiving first data and second data, the first data being indicative of estimated Quality of Experience (QoE) levels of data traffic in the wireless communication network, the data traffic being subject to Quality of Service (QOS) rules enforced by one or more nodes of the wireless communication network and the second data being indicative of QoS statistics observed in association with the QoE levels, wherein the data traffic relates to a plurality of users;

processing circuitry, and a memory containing program code executable by the processing circuitry, wherein execution of the program code by the processing circuitry causes the node to:

determine, based on the first data and the second data, a traffic forwarding policy for the data traffic, the traffic forwarding policy being expected to ensure that a QoE target is met; and determine a set of the one or more QOS rules, wherein at least a part of the first data and of the second data are based on the data traffic being subject to the set of QOS rules, and the set of QOS rules is applied for only a subgroup of the plurality of users.

19. A method performed by a network data analytics function (NWADF) of a wireless communication network for controlling user data traffic in the wireless communication network, the method comprising:

the NWADF receiving from a policy function of the wireless communication network a subscribe request message for subscribing to a quality of service (QOS) management service, wherein the subscribe request message comprises a first user equipment (UE) identifier (ID) for identifying a first UE;

after receiving the subscribe request message, the NWADF transmitting to the policy function a QoS rule message comprising the first UE ID and a first set of one or more QoS rules comprising a first QoS rule;

the NWADF receiving from the policy function a response message responsive to the QOS rule message, the response message comprising information indicating that the first QoS rule will be applied to traffic to and/or from the first UE;

after receiving the response message, the NWADF obtaining QoS information indicating the first QOS rule's affect on the first UE's quality of experience (QoE);

based on the obtained QoS information, the NWADF determining whether or not to recommend the first QOS rule for the first UE and/or another UE; and as a result of determining to recommend the first QoS rule for the first UE and/or the another UE, the NWADF transmitting to the policy function a QoS management notify message comprising information indicating that the first QoS rule is a recommended rule for the first UE and/or the another UE.

* * * * *